United States Patent Office 2,956,996
Patented Oct. 18, 1960

2,956,996

ALKYLATED PHENOTHIAZINECARBOXAMIDE DERIVATIVES

Paul N. Craig, Roslyn, Pa., assignor to Smith Kline & French Laboratories, Philadelphia, Pa., a corporation of Pennsylvania No Drawing. Filed Jan. 22, 1958, Ser. No. 710,413

6 Claims. (Cl. 260—243)

This invention relates to new alkylated phenothiazinecarboxamide derivatives which have useful pharmacological activity.

More specifically the compounds of this invention have utility as tranquilizers, antiemetics, antihistaminics and general central nervous system depressants. In addition they have chemotherapeutic activity, such as antibacterial and antifungal activity.

The structures of the compounds of this invention are represented by the following general formula:

FORMULA I

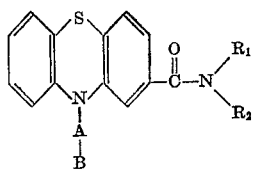

when:

$R_1$ and $R_2$ represent lower alkyl, preferably methyl or ethyl groups.

A represents a divalent, straight or branched lower alkylene chain, containing 2 to 6, preferably 2 to 4 carbon atoms, separating the two nitrogen atoms by at least 2 carbons, and B represents di-lower-alkylamino, preferably dimethylamino or diethylamino, pyrrolidinyl, piperidinyl, morpholinyl, piperazinyl, N-lower-alkyl-piperazinyl, N-(hydroxy-lower-alkylene)-piperazinyl, N-(lower-alkanoyloxy-lower-alkylene)-piperazinyl, N-(hydroxy-lower-alkyleneoxy-lower-alkylene)-piperazinyl, preferably N-(ω-hydroxyethoxyethyl)-piperazinyl, N-(lower-alkanoyloxy-lower-alkyleneoxy-lower-alkylene)-piperazinyl, preferably N-(ω-lower-alkanoyloxyethoxyethyl)-piperazinyl.

By the terms "lower alkyl," "lower alkanoyl" and "lower alkanoyloxy" where used herein alone or in combination with other terms, aliphatic groups having a maximum of 6 carbon atoms and preferably 4 carbon atoms are indicated. The term "lower alkylene" and "lower alkyleneoxy" represent alkylene chains of from 2 to 6 carbon atoms, preferably 2 to 4 carbons. The term "lower alkylene" further indicates that a chain of at least 2 carbon atoms separate the oxygen or nitrogen atoms to which the alkylene chain is attached.

This invention also includes pharmaceutically acceptable salts of the above defined bases formed with non-toxic organic and inorganic acids. Such salts are easily prepared by methods known to the art. The base is reacted with either the calculated amount of organic or inorganic acid in aqueous miscible solvent, such as acetone or ethanol, with isolation of the salt by concentration and cooling or an excess of the acid in aqueous immiscible solvent, such as ethyl ether or chloroform, with the desired salt separating directly. Exemplary of such organic salts are those with maleic, fumaric, benzoic, ascorbic, pamoic, succinic, bismethylenesalicylic, methanesulfonic, ethanedisulfonic, acetic, propionic, tartaric, salicyclic, citric, gluconic, lactic, malic, mandelic, cinnamic, citraconic, aspartic, stearic, palmitic, itaconic, glycolic, p-aminobenzoic, glutamic, benzene sulfonic and theophylline acetic acids as well as with the 8-halotheophyllines, for example, 8-bromotheophylline. Exemplary of such inorganic salts are those with hydrochloric, hydrobromic, sulfuric, sulfamic, phosphoric and nitric acids. Of course, these salts may also be prepared by the classical method of double decomposition of appropriate salts which is well-known to the art.

The compounds of this invention are prepared from 2-phenothiazinecarboxylic acid according to the following synthetic procedure:

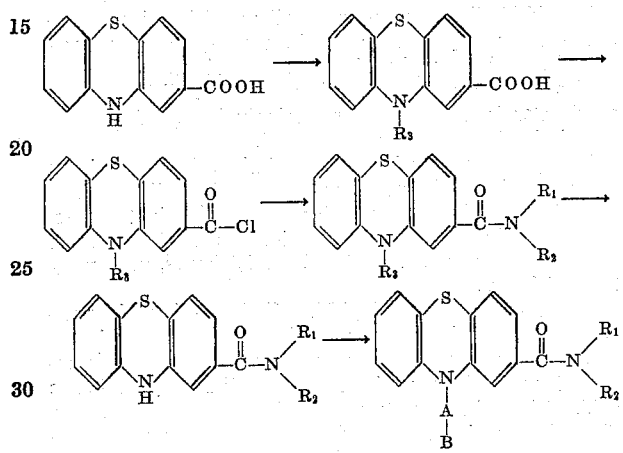

$R_3$ represents hydrogen or an acetyl group. The terms $R_1$, $R_2$, A and B are as previously defined.

The phenothiazinecarboxylic acid starting material is converted to the N-acetyl compound by reacting 2-phenothiazinecarboxylic acid with a reactive acetyl compound such as, for example, acetic anhydride or an acetic halide, preferably acid chloride. The reaction is advantageously run by refluxing 2-phenothiazinecarboxylic acid with acetic anhydride, preferably in the presence of a catalytic amount of acid, for example, concentrated sulfuric or hydrochloric acid. A base may be included in the reaction mixture, most advantageously when the acetylating agent is an acyl halide. Suitable bases are aliphatic or aromatic tertiary amines, such as, for example, tributylamine or pyridine. The reaction mixture is then filtered and acidified with dilute mineral acid, for example dilute hydrochloric acid or sulfuric acid. The resulting 10-acetyl-2-phenothiazinecarboxylic acid is obtained by filtration and may be purified by recrystallization from a suitable solvent, for example acetone-water.

The 10-acetyl-2-phenothiazinecarboxylic acid is converted to the corresponding acid halide, preferably chloride by use of a halogenating agent such as phosphorous pentachloride. The reactants are mixed and heated. An aromatic solvent, such as benzene, toluene or xylene, is added. The mixture is filtered and the filtrate is heated for a short period. Alternatively, the 10-acetyl-2-phenothiazinecarboxylic acid may be treated with sodium carbonate and oxalyl chloride to give the 10-acetyl-2-phenothiazinecarboxyl chloride.

To the aromatic solution of 10-acetyl-2-phenothiazine-carboxyl halide is added an aqueous solution of a secondary amine, such as a dialkylamine, for example dimethylamine or diethylamine. The mixture is stirred for about 10-30 minutes and the aromatic layer is separated from the aqueous layer. Washing the aromatic layer with water, drying over a drying agent such as magnesium sulfate and evaporating the solvent yields the 10-acetyl-N,N-dialkyl-2-phenothiazinecarboxamide.

The 10-acetyl group is hydrolyzed off by heating the acetyl compound with suitable hydrolytic agents such as, for example, glacial acetic acid and hydrochloric acid. When the reaction mixture is poured into water, the N,N-dialkyl-2-phenothiazinecarboxamide separates and can be isolated by filtration.

The substituted 2-phenothiazinecarboxamides are alkylated in the 10-position with a reactive dialkylaminoalkyl ester containing the desired —A—B moiety such as a halide, preferably chloride or bromide, or an aryl sulfonate, preferably toluene sulfonate. The reaction is carried out advantageously by refluxing the reactants in a suitable inert aromatic solvent such as, preferably, benzene, toluene or xylene, in which at least one of the reactants must be soluble. A suitable acid-binding agent is usually included such as an alkali metal amide, preferably sodium, potassium or lithium amide. Other suitable acid-binding agents are alkali metal hydrides, preferably sodium hydride, or alkali metal aryl or alkyl compounds, preferaby phenyl or octyl sodium.

If an acid addition salt of the reactive dialkylaminoalkyl ester is used, a correspondingly increased amount of acid-binding agent must be used.

The preferred method of alkylation, however, is to react the phenothiazinecarboxamide with a slight excess of a dialkylaminoalkyl chloride or bromide in the presence of sodium or potassium amide in refluxing benzene or toluene for from 30 minutes to 36 hours, preferably 3 to 24 hours.

The 10-dialkylaminoalkyl-N,N-dialkyl-2-phenothiazinecarboxamide is isolated by cooling the reaction mixture and adding an excess of water. The organic layer is extracted with dilute acid, preferably dilute hydrochloric acid. The acid extracts are combined, neutralized with dilute base and extracted with benzene. The dried benzene extracts are evaporated and the resulting residue is purified by molecular distillation. The basic oil may be dissolved in an organic solvent and converted to a salt by reacting the solution with a suitable organic or inorganic acid.

The 10 - (ω - pyrrolidinylalkyl), 10 - (ω - piperidinylalkyl) and 10-(ω-morpholinylalkyl)-phenothiazinecarboxamides are prepared advantageously by alkylating the phenothiazinecarboxamide with an ω-haloalkylpyrrolidine, ω-haloalkylpiperidine or ω-haloalkylmorpholine.

The 10 - (ω - piperazinylalkyl) - phenothiazinecarboxamides are prepared advantageously by alkylating the phenothiazinecarboxamide with an ω-haloalkylpiperazine having the free N-hydrogen of the piperazinyl moiety replaced by an easily removed moiety, for example, a benzyl, carbobenzoxy, or acyl, preferably formyl group. The N-protective group is then removed under mild conditions, such as by weakly alkaline hydrolysis in the case of the preferred formyl group. The resulting 10-(ω-piperazinylalkyl)-phenothiazinecarboxamide is then further alkylated to form the various N-substituted piperazinyl compounds represented in Formula I. Such methods of alkylation are by means of a reactive ester such as an alkyl halide in the presence of an acid-binding agent in an inert solvent such as benzene or xylene as described above or by reaction with an alkylene oxide such as ethylene oxide in a lower alcohol. In addition, 10 - (N' - alkyl-N-piperazinylalkyl)-phenothiazinecarboxamides having a terminal group on the N'-alkyl moiety capable of undergoing reaction, such as ω-hydroxyalkyl, are optionally reacted with an alkanoyl halide in the presence of an acid-binding agent to give, for example, N'-alkanoyloxyalkyl derivatives of 10-(ω-piperazinylalkyl)-phenothiazinecarboxamides.

Another synthetic route to 10-(ω-aminoalkyl)-phenothiazinecarboxamides is by means of 10-(ω-esteralkyl)-phenothiazinecarboxamides which have a reactive end group on the 10-alkyl chain, for example, an ω-tosylate or ω-chloro end group, which can be reacted with a secondary amine, for instance, a dialkylamine such as, for example, dimethylamine or diethylamine, or piperidine. The reaction is carried out advantageously by refluxing the ester and amine in the presence of an acid-binding agent for short periods.

It will be readily apparent to one skilled in the art that certain of the compounds of this invention, notably those in which A is represented by an aliphatic carbon chain branched so that an asymmetric carbon atom is formed, may be present as optical isomers. The connotation of the general formulae presented herein is to include all isomers, the separated $d$ or $l$ optical isomers as well as the $dl$ mixture of these isomers.

The following examples are not limiting but are illustrative of compounds of this invention and the procedures for their preparation and will serve to make fully apparent all of the compounds embraced by the general formula given above and the preparation thereof respectively.

Example 1

A mixture of 10.0 g. of 2-phenothiazinecarboxylic acid, 100 ml. of acetic anhydride and 2 drops of concentrated sulfuric acid is refluxed for one hour. The solution is evaporated in vacuo and the residue is taken up in a dilute aqueous ammonia solution. The solution is filtered and the filtrate acidified. Light green crystals of 10-acetyl-2-phenothiazinecarboxylic acid are obtained which on recrystallization from acetone-water yield crystals with M.P. 199–201° C.

10-acetyl-2-phenothiazinecarboxylic acid (7.2 g.) is intimately mixed with 10.0 g. of phosphorous pentachloride and heated for five minutes. Benzene (25 ml.) is added and the mixture is filtered. The filtrate is heated for five minutes. To the cooled filtrate, 50 ml. of a 25% aqueous dimethylamine solution is added and the mixture is stirred for 15 minutes. The benzene layer is separated; the basic water layer is washed with benzene and the combined benzene layers are washed with water, then dried over magnesium sulfate. The benzene is evaporated to yield the crude, 10-acetyl-N,N-dimethyl-2-phenothiazinecarboxamide.

This acetyl compound (1.0 g.) is dissolved in glacial acetic acid. A mixture of 31% hydrochloric acid (7.9 g.) and glacial acetic acid (3.0 g.) is added and the resulting mixture is heated on the steam bath for 10 minutes with occasional stirring. The mixture is poured into water and a yellow precipitate is filtered off. Recrystallization from acetone yields N,N-dimethyl-2-phenothiazinecarboxamide, M.P. 161–163.5° C.

A mixture of 7.6 of N,N-dimethyl-2-phenothiazinecarboxamide in 100 ml. of dry xylene and 1.4 g. of sodium amide is refluxed for one hour. A solution of 3-dimethylaminopropyl chloride (4.9 g.) in 25 ml. of toluene is added and the resulting mixture refluxed and stirred for four hours. Water is added to the cooled mixture and the organic layer is separated. The water layer is extracted with benzene and the combined aromatic layers are extracted with dilute hydrochloric acid and water. This aqueous solution is made basic with sodium bicarbonate solution and extracted with benzene. The benzene extract is dried over magnesium sulfate. Evaporation of the solvent yields 10-(3'-dimethylaminopropyl)-N,N-dimethyl-2-phenothiazinecarboxamide which is purified by molecular distillation at 224–225° C. and 60–90 microns.

The free base (5.1 g.) in 100 ml. of acetone is treated with a solution of citric acid (3.0 g.) in acetone. The resulting 10-(3'-dimethylaminopropyl)-N,N-dimethyl-2-phenothiazinecarboxamide citrate is filtered off, washed with acetone and water and dried in vacuo, M.P. 94.5–96.5° C.

Example 2

Acetyl chloride (4.0 g.) is added slowly to a solution of 2-phenothiazinecarboxylic acid (10.0 g.) in benzene (100 ml.) and pyridine (20 ml.) while stirring vigorously. The reaction mixture is heated on the steam bath for 30 minutes, then cooled and filtered. The solution is washed with water and evaporated in vacuo and the residue is recrystallized from acetone-water to yield crystalline 10-acetyl-2-phenothiazinecarboxylic acid.

A mixture of 7.0 g. of 10-acetyl-2-phenothiazinecarboxylic acid and 10.0 g. of phosphorous pentachloride is heated at about 70° C. for five minutes. Benzene (50 ml.) is added and the mixture is filtered. The filtrate is heated for 10 minutes. To the cooled filtrate, 50 ml. of 25% aqueous diethylamine is added and the resulting mixture is stirred for 15 minutes. The benzene layer is separated and the basic water layer is washed with benzene. The combined benzene layers are washed with water and dried over magnesium sulfate. The benzene is evaporated in vacuo to yield 10-acetyl-N,N-diethyl-2-phenothiazinecarboxamide.

This acetyl compound (1.0 g.) is hydrolyzed to N,N-diethyl-2-phenothiazinecarboxamide by heating with 31% hydrochloric acid (7.9 g.) and glacial acetic acid (3.0 g.) and isolating the product by the method of Example 1.

A mixture of 6.0 g. of N,N-diethyl-2-phenothiazinecarboxamide in 100 ml. of dry toluene and 1.2 g. of sodium amide is refluxed for one hour. A solution of 3.0 g. of 2-diethylaminoethyl chloride in 25 ml. of toluene is added and the resulting mixture is refluxed and stirred for five hours. The cooled mixture is poured into water and the organic layer is separated. The water layer is extracted with benzene and the combined benzene-toluene layers are extracted with dilute hydrochloric acid and water. This aqueous solution is made basic with sodium carbonate solution and extracted with benzene. The benzene extract is dried over magnesium sulfate and evaporated in vacuo to yield 10-(2'-diethylaminoethyl)-N,N-diethyl-2-phenothiazinecarboxamide which is purified by molecular distillation at 225° C. and 75–80 microns.

Example 3

A mixture of 6.0 g. of N,N-diethyl-2-phenothiazinecarboxamide (prepared as in Example 2), 1.5 g. of sodium amide and 100 ml. of dry benzene is refluxed for one hour. A solution of 3.5 g. of N-(2-chloroethyl)-morpholine in 25 ml. of benzene is added and the resulting mixture is refluxed for six hours, with stirring. The reaction mixture is worked up as in Example 2 to yield 10-(2'-N-morpholinylethyl)-N,N-diethyl-2-phenothiazinecarboxamide.

The free base (2.0 g.) is dissolved in 250 ml. of ether and treated with an excess of alcoholic hydrogen chloride to separate the hydrochloride salt.

Example 4

A mixture of 5.4 g. of N,N-dimethyl-2-phenothiazinecarboxamide (prepared as in Example 1) and 1.0 g. of sodium amide in 100 ml. of toluene is refluxed for 90 minutes. A solution of 4.0 g. of N-(3-chloropropyl)-piperidine in 50 ml. of xylene is added and the mixture is refluxed for six hours. The reaction mixture is worked up as in Example 1 to yield 10-(3'-N-piperidinylpropyl)-N,N-dimethyl-2-phenothiazinecarboxamide.

A solution of the free base (1.0 g.) in ether (50 ml.) is treated with an excess of alcoholic hydrogen bromide to yield the crude hydrobromide salt.

Example 5

A mixture of 5.4 g. of N,N-dimethyl-2-phenothiazinecarboxamide (prepared as in Example 1), 1.0 g. of sodium amide and 75 ml. of xylene is stirred and heated at reflux for one hour. A solution of 3.5 g. of N-(3-chloropropyl)-pyrrolidine in 25 ml. of xylene is added and the resulting mixture is refluxed for seven hours, with stirring. The cooled reaction mixture is treated with water, extracted with dilute hydrochloric acid and the acid extracts are neutralized with aqueous ammonia. After benzene extraction and subsequent removal of the dried solvent in vacuo, the residue is purified by molecular distillation at 220° C. and 75 microns to give 10-(3'-N-pyrrolidinylpropyl)-N,N-dimethyl - 2 - phenothiazinecarboxamide.

Example 6

A stirred mixture of 5.4 g. of N,N-dimethyl-2-phenothiazinecarboxamide (prepared as in Example 1), 1.0 g. of sodium amide and 125 ml. of xylene is refluxed for 40 minutes. A solution of 4.5 g. of 1-formyl-4-(3'-chloropropyl)-piperazine in 25-ml. of xylene is added and the mixture is refluxed for 12 hours. The reaction mixture is treated with about 50 ml. of water and the separated organic layer extracted with dilute hydrochloric acid. The acidic extracts are made basic with sodium carbonate solution and further extracted with benzene. Distillation of the solvent in vacuo gives the residual product, 10-[3'-(N-formyl-piperazinyl)-propyl]-N,N - dimethyl-2-phenothiazinecarboxamide.

A mixture of 20.0 g. of this carboxamide in 150 ml. of ethanol and 100 ml. of water containing 6 ml. of 40% sodium hydroxide solution is heated at reflux for 15 minutes. The ethanol is removed by distillation in vacuo on the steam bath and the residue is treated with benzene and water. The dried benzene layer is evaporated in vacuo to yield 10-(3'-N-piperazinylpropyl)-N,N-dimethyl-2-phenothiazinecarboxamide.

Example 7

One equivalent of ethylene oxide is added to a mixture of 4.0 g. of 10-(3'-N-piperazinylpropyl)-N,N-dimethyl-2-phenothiazinecarboxamide (prepared as in Example 6) in 25 ml. of methanol and the mixture heated at reflux for two hours. The solvent is removed in vacuo to give crude 10-[3'-(N-hydroxyethylpiperazinyl)-propyl]-N,N-dimethyl-2-phenothiazinecarboxamide.

Example 8

A mixture of 4.5 g. of 10-[3'(N-hydroxyethylpiperazinyl)- propyl]-N,N-dimethyl-2-phenothiazinecarboxamide (prepared as in Example 7) and 50 ml. of benzene is treated with a solution of 1.2 g. of acetyl chloride in 15 ml. of benzene. The resulting mixture is refluxed for 30 minutes, cooled and evaporated in vacuo to give the residual 10-[3'-(N-acetoxyethylpiperazinyl)-propyl]-N,N-dimethyl-2 - phenothiazinecarboxamide monohydrochloride. This salt (1.0 g.) is dissolved in alcohol (100 ml.) and reacted with an excess of alcoholic hydrogen chloride to yield the dihydrochloride upon concentration.

Example 9

A mixture of 4.5 g. of 10-[3'-(N-hydroxyethylpiperazinyl) - propyl] - N,N-dimethyl-2-phenothiazinecarboxamide (prepared as in Example 7) and 75 ml. of benzene is treated with a solution of 1.5 g. of n-caproyl chloride in 25 ml. of benzene. The resulting mixture is refluxed for 30 minutes, cooled and the solvent evaporated in vacuo to yield 10-[3'-(N-caproyloxyethylpiperazinyl)-propyl] - N,N - dimethyl - 2 - phenothiazinecarboxamide monohydrochloride.

This salt (1.0 g.) is dissolved in ethanol (75 ml.) and reacted with alcoholic hydrogen chloride to yield the dihydrochloride salt upon concentration.

Example 10

A mixture of 4.5 g. of 10-[3'-(N-hydroxyethylpiperazinyl) - propyl] - N,N-dimethyl-2-phenothiazinecarboxamide (prepared as in Example 7) and 100 ml. of xylene is treated with a solution of 1.5 g. of isocaproyl chloride in 25 ml. of xylene. The resulting mixture is refluxed for 20 minutes cooled and all solvents removed in vacuo to give 10-[3'-(N-isocaproyloxyethylpiperazinyl)-propyl]-N,N - dimethyl-2-phenothiazinecarboxamide monohydrochloride.

This salt (1.0 g.) in 100 ml. of ethyl acetate is reacted with an excess of alcoholic hydrogen chloride to give the dihydrochloride salt upon concentration.

*Example 11*

A suspension of 4.0 g. of 10-(3'-N-piperazinylpropyl)-N,N-dimethyl-2-phenothiazinecarboxamide (prepared as in Example 6), 2.0 g. of 2-bromo-2'-hydroxyethyl ether and 3.0 g. of potassium carbonate in 100 ml. of toluene is refluxed for eight hours. The reaction mixture is poured into water and the separated organic layer is extracted with dilute hydrochloric acid. The acidic extracts are made basic and extracted with benzene. Evaporation of the benzene yields crude 10-[3'-(N-hydroxyethoxyethylpiperazinyl) - propyl]-N,N-dimethyl-2-phenothiazinecarboxamide.

*Example 12*

A solution of 2.0 g. of 10-[3'-(N-hydroxyethoxyethylpiperazinyl) - propyl] - N,N-dimethyl-2-phenothiazinecarboxamide, prepared as in Example 11) in 50 ml. of dry benzene is treated with 1.0 g. of acetyl chloride. The reaction mixture is stirred at room temperature for three hours and then poured into water, neutralized with sodium carbonate solution and extracted with benzene. Evaporation of the solvent in vacuo yields 10-[3'(N-acetoxyethoxyethylpiperazinyl)-propyl] - N,N-dimethyl - 2 - phenothiazinecarboxamide.

*Example 13*

A solution of 2.0 g. of 10-[3'-(N-hydroxyethoxyethylpiperazinyl)-propyl]-N,N-dimethyl-2 - phenothiazine-carboxamide (prepared as in Example 11) in 75 ml. of dry benzene is mixed with 1.5 g. of n-caproyl chloride. The resulting mixture is refluxed for 30 minutes, cooled and the solvent evaporated in vacuo to yield 10-[3'-(N-caproyloxyethoxyethylpiperazinyl)- propyl] - N,N - dimethyl-2-phenothiazinecarboxamide monohydrochloride.

This salt (1.0 g.) in alcoholic solution is reacted with an excess of alcoholic hydrogen chloride to give the dihydrochloride upon concentration.

*Example 14*

A mixture of 5.4 g. of N,N-dimethyl-2-phenothiazinecarboxamide (prepared as in Example 1), 1.0 g. of sodium amide and 100 ml. of xylene is stirred and refluxed for one hour. A solution of 4.2 g. of 1-(3'-chloropropyl)-4-methylpiperazine in 25 ml. of xylene is added and the mixture is refluxed for seven hours. The cooled reaction mixture is treated with water and the separated organic layer is extracted with dilute hydrochloric acid. The acid extracts are neutralized with aqueous ammonia and extracted with benzene. Evaporation of the solvent in vacuo and purification of the residue by molecular distillation at 225° C. and 10–20 microns yields 10-[3'-(N-methylpiperazinyl)-propyl]-N,N-dimethyl - 2 - phenothiazinecarboxamide.

A solution of 1.0 g. of the free base in 75 ml. of ethyl acetate is treated with an excess of alcoholic maleic acid to give the dimaleate salt upon concentration and cooling.

*Example 15*

A mixture of 5.4 g. of N,N-dimethyl-2-phenothiazinecarboxamide (prepared as in Example 1), 1.0 g. of sodium amide and 100 ml. of toluene is refluxed for one hour. A solution of 4.5 g. of 1-(3'-chloropropyl)-4-ethylpiperazine in 25 ml. of toluene is added and the mixture is refluxed for eight hours. The reaction mixture is worked up as in Example 14 to give 10-[3'-(N-ethylpiperazinyl)-propyl]-N,N-dimethyl - 2 - phenothiazinecarboxamide.

*Example 16*

To a mixture of 1.2 g. of sodium amide in 100 ml. of anhydrous toluene heated to reflux, is added 5.4 g. of N,N-dimethyl-2-phenothiazinecarboxamide (prepared as in Example 1) dissolved in 200 ml. of hot toluene. The resulting mixture is stirred and refluxed for two hours. A solution of 4.5 g. of 1-(3'-chloropropyl)-4-isobutylpiperazine in 50 ml. of toluene is added and the refluxing continued for 10 hours, with stirring. The reaction mixture is worked up as in Example 14 to yield 10-[3'-(N-isobutylpiperazinyl)-propyl]-N,N-dimethyl- 2 - phenothiazinecarboxamide.

*Example 17*

A mixture of 5.4 g. of N,N'-dimethyl-2-phenothiazinecarboxamide (prepared as in Example 1), 1.2 g. of sodium amide and 3.0 g. of 1-chloro-3-dimethylamino-2-methylpropane in 150 ml. of dry xylene is stirred and heated at reflux for 12 hours. After cooling, the reaction mixture is treated with water and the organic layer is extracted with dilute hydrochloric acid. The acid extracts are neutralized with sodium carbonate solution and extracted with benzene. Removal of the solvent in vacuo gives crude 10-(3'-dimethylamino-2'-methyl-propyl)-N,N-dimethyl-2-phenothiazinecarboxamide.

*Example 18*

A mixture of 4.0 g. of 10-(3'-N-piperazinylpropyl)-N,N-dimethyl-2-phenothiazinecarboxamide (prepared as in Example 6), 1.8 g. of 4-bromo-1-butanol, 2.0 g. of sodium carbonate and 125 ml. of xylene is refluxed with stirring for 24 hours. The cooled reaction mixture is treated with water and the separated organic layer is dried over magnesium sulfate. Evaporation of the solvent in vacuo yields crude 10-{3'-[N-(4-hydroxybutyl)-piperazinyl]-propyl}-N,N-dimethyl - 2 - phenothiazinecarboxamide.

*Example 19*

A mixture of 4.7 g. of 10-{3'-[N-(4-hydroxybutyl)-piperazinyl]-propyl}-N,N-dimethyl - 2 - phenothiazinecarboxamide (prepared as in Example 18) and 75 ml. of benzene is treated with a solution of 1.2 g. of acetyl chloride in 15 ml. of benzene. The resulting mixture is refluxed for one hour, cooled and evaporated in vacuo to give 10-{3'-[N-(4-acetoxybutyl)-piperazinyl]-propyl}-N,N-dimethyl-2-phenothiazinecarboxamide monohydrochloride.

An alcoholic solution of this salt (1.0 g.) is treated with an excess of hydrogen chloride in alcohol solution to give the dihydrochloride upon concentration.

What is claimed is:

1. A chemical compound of the class consisting of a free base and its nontoxic, pharmaceutically acceptable, acid addition salts, the free base having the structural formula

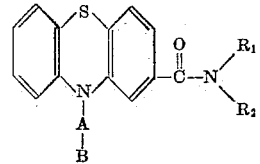

in which $R_1$ and $R_2$ are lower alkyl; B is a member selected from the group consisting of di-lower-alkylamino, pyrrolidinyl, piperidinyl, morpholinyl, piperazinyl, N-lower-alkyl-piperazinyl, N- (hydroxy - lower - alkylene)-piperazinyl, N - (lower - alkanoyloxy - lower - alkylene)-piperazinyl, N-(hydroxy-lower-alkyleneoxy-lower - alkylene)-piperazinyl and N-(lower-alkanoyloxy-lower-alkyleneoxy-lower-alkylene)-piperazinyl; each of the said lower-alkyl, lower-alkylene and lower-alkanoyl moieties having 2 to 6 carbon atoms and A is an alkylene chain having 2 to 6 carbon atoms separating the nitrogen atoms of the phenothiazine nucleus and the nitrogen atom of B to which it is attached by at least 2 carbons.

2. 10-(3'-dimethylaminopropyl)-N,N-dimethyl-2-phenothiazinecarboxamide.

3. 10-(3'-dimethylamino-2'- methyl - propyl) - N,N-dimethyl-2-phenothiazinecarboxamide.
4. 10[3'-(N-methylpiperazinyl)-propyl]-N,N-dimethyl-2-phenothiazinecarboxamide.
5. 10-[3'-(N-hydroxyethylpiperazinyl)-propyl]-N,N-dimethyl-2-phenothiazinecarboxamide.
6. 10-[3'-(N-hydroxyethoxyethylpiperazinyl)-propyl]-N,N-dimethyl-2-phenothiazinecarboxamide.

References Cited in the file of this patent

UNITED STATES PATENTS

| | | |
|---|---|---|
| 2,272,498 | Zerweck | Feb. 10, 1942 |
| 2,534,237 | Cusic | Dec. 19, 1950 |
| 2,591,679 | Cusic | Apr. 8, 1952 |
| 2,676,971 | Cusic | Apr. 27, 1954 |
| 2,789,978 | Rath | Apr. 23, 1957 |
| 2,838,507 | Cusic | June 10, 1958 |
| 2,877,224 | Jacob et al. | Mar. 10, 1959 |

FOREIGN PATENTS

| | | |
|---|---|---|
| 203,503 | Austria | May 25, 1959 |

OTHER REFERENCES

Fieser and Fieser: Organic Chemistry, 3rd ed., p. 241 (Reinhold Publishing Corp., New York, 1956).

J. Org. Chem., vol. 19, No. 7, July 1954. Article by Burger et al., pages 1113–1116.

Bull. Soc. Chim., France, 1955. Article by Cauquil et al., pp. 768–783.